(12) United States Patent
Katayama et al.

(10) Patent No.: US 11,050,095 B2
(45) Date of Patent: *Jun. 29, 2021

(54) SEPARATOR FOR ELECTROCHEMICAL DEVICE, AND ELECTROCHEMICAL DEVICE

(75) Inventors: Hideaki Katayama, Osaka (JP); Toshihiro Abe, Osaka (JP); Nobuaki Matsumoto, Osaka (JP); Fusaji Kita, Osaka (JP); Shigeo Aoyama, Osaka (JP)

(73) Assignee: Maxell Holdings, Ltd., Kyoto (JP)

( * ) Notice: Subject to any disclaimer, the term of this patent is extended or adjusted under 35 U.S.C. 154(b) by 1759 days.

This patent is subject to a terminal disclaimer.

(21) Appl. No.: 11/666,921

(22) PCT Filed: Dec. 8, 2005

(86) PCT No.: PCT/JP2005/022540
§ 371 (c)(1),
(2), (4) Date: May 3, 2007

(87) PCT Pub. No.: WO2006/062153
PCT Pub. Date: Jun. 15, 2006

(65) Prior Publication Data
US 2007/0264577 A1 Nov. 15, 2007

(30) Foreign Application Priority Data

Dec. 8, 2004 (JP) .............................. JP2004-354850
Aug. 10, 2005 (JP) .............................. JP2005-232250
Oct. 25, 2005 (JP) .............................. JP2005-309465

(51) Int. Cl.
*H01M 10/42* (2006.01)
*H01M 50/44* (2021.01)
(Continued)

(52) U.S. Cl.
CPC ..... *H01M 10/4235* (2013.01); *H01M 50/411* (2021.01); *H01M 50/431* (2021.01);
(Continued)

(58) Field of Classification Search
CPC ......... H01M 10/0525; H01M 10/4235; H01M 2/162; H01M 2/1626; H01M 2/1653;
(Continued)

(56) References Cited

U.S. PATENT DOCUMENTS 4,711,719 A * 12/1987 Leenaars ............ B01D 67/0048
210/500.26
4,741,979 A 5/1988 Faust et al.
(Continued)

FOREIGN PATENT DOCUMENTS

EP 1184917 A2 3/2002
EP 1 359 632 A2 11/2003
(Continued)

OTHER PUBLICATIONS

Boehmite Mineral Data, Excalibur Mineral Company.*
(Continued)

*Primary Examiner* — Adam A Arciero
(74) *Attorney, Agent, or Firm* — Birch, Stewart, Kolasch & Birch, LLP (57) ABSTRACT

An electrochemical device having excellent safety at high temperature is provided by using a separator for an electrochemical device, which is made of a porous film comprising: a porous base (5) having a heat-resistant temperature of 150° C. or higher and including filler particles (3); at least one kind of shutdown resin (6) selected from the group consisting of resin A that has a melting point in a range of 80° C. to 130° C. and resin B that absorbs an electrolyte and swells due to heating, and the swelling degree is increased as the temperature rises; and a binder (4).

11 Claims, 3 Drawing Sheets

(51) Int. Cl.
*H01M 50/411* (2021.01)
*H01M 50/431* (2021.01)
*H01M 4/133* (2010.01)
*H01M 10/0525* (2010.01)
*H01M 4/131* (2010.01)
*H01M 50/429* (2021.01)

(52) U.S. Cl.
CPC .......... *H01M 50/44* (2021.01); *H01M 4/131* (2013.01); *H01M 4/133* (2013.01); *H01M 10/0525* (2013.01); *H01M 50/4295* (2021.01)

(58) Field of Classification Search
CPC .... H01M 4/131; H01M 4/133; H01M 50/409; H01M 50/431
USPC .......................................................... 429/129
See application file for complete search history.

(56) References Cited

U.S. PATENT DOCUMENTS

| | | | |
|---|---|---|---|
| 6,153,337 A | 11/2000 | Carlson et al. | |
| 6,200,706 B1 * | 3/2001 | Ashida et al. | 429/249 |
| 6,287,720 B1 | 9/2001 | Yamashita et al. | |
| 6,387,565 B1 | 5/2002 | Aihara et al. | |
| 6,403,007 B1 * | 6/2002 | Kido et al. | 264/234 |
| 6,432,586 B1 | 8/2002 | Zhang | |
| 6,447,958 B1 | 9/2002 | Shinohara et al. | |
| 6,511,774 B1 * | 1/2003 | Tsukuda | H01M 2/16 429/142 |
| 6,627,346 B1 | 9/2003 | Kinouchi et al. | |
| 6,632,561 B1 * | 10/2003 | Bauer et al. | 429/144 |
| 6,723,467 B2 | 4/2004 | Yoshida et al. | |
| 6,811,928 B2 | 11/2004 | Aihara et al. | |
| 6,881,515 B2 * | 4/2005 | Wensley | H01M 2/16 429/129 |
| 7,662,517 B2 | 2/2010 | Lee et al. | |
| 2002/0012848 A1 * | 1/2002 | Callahan et al. | 429/306 |
| 2003/0036002 A1 | 2/2003 | Yoshida et al. | |
| 2003/0087158 A1 | 5/2003 | Nakagawa et al. | |
| 2003/0129379 A1 | 7/2003 | Yao et al. | |
| 2004/0166297 A1 | 8/2004 | Yao et al. | |
| 2004/0244675 A1 | 12/2004 | Kishimoto et al. | |
| 2005/0031942 A1 | 2/2005 | Hennige et al. | |
| 2005/0186479 A1 | 8/2005 | Totsuka et al. | |
| 2005/0208383 A1 | 9/2005 | Totsuka et al. | |
| 2005/0221165 A1 | 10/2005 | Hennige et al. | |
| 2006/0078791 A1 | 4/2006 | Hennige et al. | |
| 2006/0134526 A1 | 6/2006 | Han et al. | |
| 2006/0246356 A1 * | 11/2006 | Abe et al. | 429/326 |
| 2006/0263693 A1 | 11/2006 | Kim et al. | |
| 2006/0286446 A1 | 12/2006 | Chun et al. | |
| 2008/0138700 A1 | 6/2008 | Horpel et al. | |
| 2008/0248381 A1 | 10/2008 | Hennige et al. | |
| 2009/0067119 A1 | 3/2009 | Katayama et al. | |
| 2010/0015530 A1 * | 1/2010 | Katayama et al. | 429/246 |
| 2011/0003209 A1 | 1/2011 | Katayama et al. | |
| 2013/0260208 A1 | 10/2013 | Cho et al. | |

FOREIGN PATENT DOCUMENTS

| | | | | |
|---|---|---|---|---|
| GB | 2027637 A | * | 2/1980 | B01D 39/1692 |
| JP | 60-136161 A | | 7/1985 | |
| JP | 1-258358 A | | 10/1989 | |
| JP | 2-86056 A | | 3/1990 | |
| JP | 4-54634 B2 | | 8/1992 | |
| JP | 4-340972 A | | 11/1992 | |
| JP | 5-74436 A | | 3/1993 | |
| JP | 5-335005 A | | 12/1993 | |
| JP | 8-287949 A | | 11/1996 | |
| JP | 9-134028 A | | 5/1997 | |
| JP | 9-259856 A | | 10/1997 | |
| JP | 11-40130 A | | 2/1999 | |
| JP | 11-185773 A | | 7/1999 | |
| JP | 2000-30686 A | | 1/2000 | |
| JP | 2000-48639 A | | 2/2000 | |
| JP | 2000-306568 A | | 11/2000 | |
| JP | 2000-348704 A | | 12/2000 | |
| JP | 2001-84987 A | | 3/2001 | |
| JP | 2001-93498 A | | 4/2001 | |
| JP | 2001-135295 A | | 5/2001 | |
| JP | 2001-266828 A | | 9/2001 | |
| JP | 2001-291503 A | | 10/2001 | |
| JP | 2001-527274 A | | 12/2001 | |
| JP | 2002-025531 A | | 1/2002 | |
| JP | 2002-42867 A | | 2/2002 | |
| JP | 2002-151040 A | | 5/2002 | |
| JP | 2002-166218 A | | 6/2002 | |
| JP | 2002-237332 A | | 8/2002 | |
| JP | 2002-541633 A | | 12/2002 | |
| JP | 2003-7279 A | | 1/2003 | |
| JP | 2003-22843 A | | 1/2003 | |
| JP | 2003-123728 A | | 4/2003 | |
| JP | 2003-206475 A | | 7/2003 | |
| JP | 2003-208924 A | | 7/2003 | |
| JP | 2003-317693 A | | 11/2003 | |
| JP | 2004-111157 A | | 4/2004 | |
| JP | 2004-241135 A | | 8/2004 | |
| JP | 2004-273282 A | | 9/2004 | |
| JP | 2004-288586 A | | 10/2004 | |
| JP | 2005-502177 A | | 1/2005 | |
| JP | 2005-302341 A | | 10/2005 | |
| JP | 2005-327633 A | | 11/2005 | |
| JP | 2005-339938 A | | 12/2005 | |
| JP | 2005-536858 A | | 12/2005 | |
| JP | 2010-120813 A | | 6/2010 | |
| KR | 10-0470314 B1 | | 2/2005 | |
| WO | WO-00/60684 A1 | | 10/2000 | |
| WO | WO-2004/049471 A2 | | 6/2004 | |
| WO | WO 2005/038946 A2 | | 4/2005 | |
| WO | WO 2005/104269 A1 | | 11/2005 | |
| WO | WO 2006/068428 A1 | | 6/2006 | |
| WO | WO 2007/066768 A1 | | 6/2007 | |

OTHER PUBLICATIONS

English Translation of JP 2003-007279A (Jan. 10, 2003).
Japanese Office Action, dated Nov. 25, 2010, for Japanese Application No. 2008-508014.
Korea Institute of Science and Technology Information Report, "New functional resin using nano-complex (high performance nano-complex)", Nov. 2004.
Korean Office Action, dated Jun. 25, 2010, for Korean Application No. 10-2008-7016484.
U.S. Office Action, dated Apr. 2, 2010, for U.S. Appl. No. 11/919,652.
U.S. Office Action, dated Oct. 20, 2010, for U.S. Appl. No. 11/919,652.
Extended European Search Report, dated Feb. 21, 2012, for European Application No. 05814154.0.
Brostow et al., "Chemical Modification and Characterization of Boehmite Particles," Chemistry & Chemical Technology, vol. 2, No. 2, 2008, pp. 27-32.
Japanese Office Action, dated Sep. 13, 2012, for Japanese Application No. 2008-124988.

* cited by examiner

SEPARATOR FOR ELECTROCHEMICAL DEVICE, AND ELECTROCHEMICAL DEVICE

TECHNICAL FIELD

The present invention relates to a separator for an electrochemical device provided at a low cost and having excellent dimensional stability at high temperature, and also an electrochemical device using the separator and being safe even in a high-temperature environment.

BACKGROUND ART

Electrochemical devices using nonaqueous electrolytes, represented by a lithium secondary battery and a supercapacitor, have been used widely as power sources for portable equipment such as mobile phones and notebook-sized personal computers, because of the characteristic of high energy density. With improvement in the performance of the portable equipment, the capacity of the electrochemical device tends to become higher, and thus securing safety has become important.

In a current-technology lithium secondary battery, a polyolefin-based porous film having a thickness of 20 to 30 μm is used as a separator to be interposed between a positive electrode and a negative electrode, for example. For the material of the separator, polyethylene (PE) having a low melting point can be used for securing a so-called shutdown effect, namely, melting a resin of the separator at or below a thermal runaway (abnormal heating) temperature of the battery so as to close the pores, thereby increasing the internal resistance of the battery and improving the safety of the battery at the time of short-circuit or the like.

For the separator, for example, a uniaxially- or biaxially-stretched film is used in order to provide porosity and improve the strength. Since such a separator is provided as a film to exist alone, a certain strength is required in view of workability or the like secured by the above-mentioned stretching. However, since crystallinity of the stretched film is increased and the shutdown temperature is raised up to approximately the thermal runaway temperature of the battery, the margin for securing the safety of the battery cannot be provided sufficiently.

Moreover, distortion occurs in the film due to the stretching, and thus when exposed to a high temperature, contraction will occur due to residual stress. The contraction temperature is extremely closer to the melting point, that is, the shutdown temperature. As a result, in a case of using a polyolefin-based porous film separator, when the temperature of the battery reaches the shutdown temperature due to anomalies in charging or the like, the current must be decreased immediately for preventing the battery temperature from rising. If the pores are not closed sufficiently and the current cannot be decreased immediately, the battery temperature will be raised easily to the contraction temperature of the separator, causing a risk of thermal runaway due to internal short-circuit.

In order to prevent a short-circuit caused by the thermal contraction, methods of using separators of a microporous film of heat-resistant resin or a nonwoven fabric have been proposed. For example, Patent document 1 discloses a separator using a microporous film of wholly aromatic polyamide, and Patent document 2 discloses a separator using a polyimide porous film. Patent document 3 discloses a separator using a polyamide nonwoven fabric, Patent document 4 discloses a separator including a base of a nonwoven fabric using aramid fibers, Patent document 5 discloses a separator using a polypropylene (PP) nonwoven fabric, and Patent document 6 discloses a technique regarding a separator using a polyester nonwoven fabric.

Though each of the above-mentioned separator made of a heat-resistant resin or heat-resistant fibers has an excellent dimensional stability at high temperature and can be made thinner, it does not have the so-called shutdown characteristic, namely, a characteristic that the pores will be closed at high temperature, the separator cannot provide sufficient safety at an abnormality, specifically when the battery temperature rises rapidly due to an external short-circuit or an internal short-circuit.

As technology for solving such problems, for example, Patent document 7 shows a separator made of a polymer, where the content of an electrolyte will be increased at high temperature. Patent document 8 suggests a separator containing thermal expansion particles such as microcapsules.

However, since a polymer film containing an electrolyte is used as a base of a separator according to the technique described in Patent document 7, the strength may deteriorate easily. As a result, it will be difficult to decrease the thickness of the separator for raising the battery capacity. Inherently, Patent document 7 has a description about the material and function of the separator but the document is silent about how to produce the separator. Even the form of the separator is not clarified. According to the technique as described in Patent document 8, since the thermal expansion of the particles in the separator occurs irreversibly, processes at a temperature equal to or higher than the temperature causing thermal expansion are not applicable in the steps of producing a separator or a battery. Especially, for a lithium secondary battery that must be dried sufficiently, a temperature control in the drying step must be carried out strictly.

Patent document 1: JP H05-335005 A
Patent document 2: JP 2000-306568 A
Patent document 3: JP H09-259856 A
Patent document 4: JP H11-40130 A
Patent document 5: JP 2001-291503 A
Patent document 6: JP 2003-123728 A
Patent document 7: JP 2000-348704 A
Patent document 8: JP 2004-111157 A In another method under study, a gel electrolyte as described in Patent document 9 is used for example, in place of using a microporous film. Though the gel electrolyte has no thermal contraction, it is inferior in mechanical strength. Especially, a short-circuit or the like can occur due to degradation in the mechanical strength at high temperature. Furthermore, since a shutdown function is not provided, particularly for a battery sealed in a can of cylindrical or rectangular shape, sufficient safety cannot be secured. Moreover, in technology using a gel electrolyte, even when particles or fibers are used for reinforcement to secure the mechanical strength as described in Patent documents 10 and 11, a shutdown function is not provided, and thus problems regarding safety may occur.

Patent document 9: JP H08-287949 A
Patent document 10: JP H11-185773 A
Patent document 11: JP 2002-237332 A Patent document 12 shows a technique for forming a separator with excellent liquid-retaining property. According to the document, fine particles such as crosslinked polymethyl methacrylate (PMMA) are dispersed in a solution including a base resin such as polyvinylidene fluoride so as to apply the solution and dry, so that the crosslinked fine particles are held in the pores of the porous resin film.

However, the above-described porous resin film as disclosed in Patent document 12 is substantially identical to a polymer gel electrolytic film, and thus the electrolyte in the separator is absorbed and held by the crosslinked fine particles and the porous resin film. As a result, reaction of the battery will not be suppressed at high temperature, and problems in safety may occur just as the case of the above-described gel electrolyte.

Patent document 12: JP 2004-241135 A

Therefore, with the foregoing in mind, it is an object of the present invention to provide a separator that can form an electrochemical device with excellent safety at a time of abnormal heating, and an electrochemical device comprising the separator.

DISCLOSURE OF INVENTION

A separator for an electrochemical device of the present invention is a separator comprising a porous film comprising a porous base and a resin. The porous base has a heat-resistant temperature of 150° C. or higher and it contains filler particles. The resin is at least one kind of shutdown resin selected from the group consisting of resin A that has a melting point in a range of 80 to 130° C. and resin B that absorbs an electrolyte and swells by heating, and the swelling degree is increased as the temperature rises.

Moreover, an electrochemical device of the present invention includes a positive electrode, a negative electrode, a nonaqueous electrolyte and a separator, and the separator is the above-described separator for an electrochemical device of the present invention.

According to the present invention, an electrochemical device, which is excellent in safety when the battery temperature rises abnormally due to short-circuit or overcharge, can be provided.

MEANS FOR SOLVING PROBLEM

A separator of the present invention includes a porous film comprising a porous base having a heat-resistant temperature of 150° C. or higher and containing filler particles, and at least one kind of shutdown resin selected from the group consisting of resin A that has a melting point in a range of 80 to 130° C. and a resin B that absorbs an electrolyte and swells by heating, and the swelling degree increases as the temperature rises.

In a case where the separator of the present invention contains the resin A, when the temperature of the lithium secondary battery in which the separator of the present invention is incorporated reaches the melting point or higher of the resin A, a shutdown occurs, namely, the resin A is melted to close the pores in the separator so as to suppress the progress in the electrochemical reaction. In a case where the separator of the present invention contains the resin B, the resin B absorbs the electrolyte in the battery and swells as the battery temperature rises, and the swollen particles close the pores of the separator and at the same time, a liquid electrolyte present in the pores decreases to cause a shutdown.

Moreover, since the separator of the present invention comprises a porous base having a heat-resistant temperature of 150° C. or higher, even at high temperature exceeding the shutdown temperature, the shape of the separator can be kept stably, and thus a short-circuit caused by the thermal contraction can be prevented. Therefore, the safety of the battery after the occurrence of a shutdown can be improved. Here in this specification, "heat-resistant temperature" denotes an upper limit temperature at which the change in the length of an object, namely, a rate of contraction to length (contraction rate) at room temperature for the porous base, can be kept not to exceed 5%. "Heat resistance" in this specification indicates that a dimensional change caused by softening or the like will not occur substantially, and the heat resistance is evaluated on the basis of whether the heat-resistant temperature is sufficiently higher than the shutdown temperature. For improving the safety after a shutdown, it is preferable that the porous base has a heat-resistant temperature higher than the shutdown temperature by at least 20° C. More specifically, it is preferable that the heat-resistant temperature of the porous base is 150° C. or higher, and more preferably, 180° C. or higher.

Furthermore, regarding the separator of the present invention, the porous base comprises filler particles for the purpose of preventing an internal short-circuit, securing the shape stability of the separator (especially, shape stability at high temperature) or the like. That is, at least a part of the porous base is formed of the filler particles, or the filler particles are contained in the pores of the porous base. The filler particles in use are electrochemically stable fine particles having heat resistance and electric insulation, and they are stable with respect to an electrolyte and a solvent used in preparation of a separator, and merely oxidized/reduced in an operation voltage range for the battery.

More specific embodiments for the separator of the present invention include Embodiments (I) and (II) below.

Regarding the separator of Embodiment (I), numbers of filler particles aggregate and form a porous base. Many filler particles, singly or together with a fibrous material or the like, are integrated with a heat-resistant resin or the like so as to form a porous base, thereby forming a porous film together with a shutdown resin or the like.

Regarding the separator of Embodiment (II), a porous base such as a woven fabric or a nonwoven fabric (including paper) is formed of a fibrous material. Filler particles are contained in the pores of the porous base so as to form a porous film, together with a shutdown resin or the like.

Though the shape of the shutdown resin is not limited particularly, fine particles are used preferably to be dispersed homogeneously in the porous film. The size of the shutdown resin is not limited particularly as long as the diameter at drying is smaller than the thickness of the separator. Preferably, the average particle diameter is from 1/100 to 1/3 of the separator thickness. Specifically, it is preferable that the average diameter is in a range of 0.1 to 20 μm. When the particle diameter is too small, spacing between the particles will be decreased, and thus the length of the ion transport path may be increased to degrade the battery characteristics. When the particle diameter is too large, the spacing will be increased to result in a short-circuit caused by lithium dendrite or the like. The average particle diameter of the shutdown resin can be determined as a number average particle diameter measured by dispersing the fine particles in a solvent like water that will not swell the shutdown resin, using a laser scattering particle size distribution meter like "LA-920" manufactured by HORIBA, for example.

The shutdown resin can be used in an alternative embodiment. The shutdown resin can be used in a state laminated on and integrated with another component such as a porous base or filler particles. When the porous base is formed of a fibrous material, fibers of a multi-layered structure having the shutdown resin on the surface of a core can be used. Alternatively, particles of a core-shell structure, where the filler particles are the core and the shutdown resin is the shell, can be used. When the resin A and the resin B are used together, the resin A can be laminated on the surface of the resin B and integrated with the resin B. Furthermore, the shutdown resin can be formed of fine particles and arranged in pores of the porous base, together with the filler particles.

The shutdown resin of the present invention is either resin A that has a melting point in a range of 80 to 130° C. or resin B that absorbs an electrolyte and swells due to heating, and the swelling degree is increased as the temperature rises. Alternatively, the resins can be used together. The melting point can be defined, for example, on the basis of a melting temperature measured by using a differential scanning calorimeter (DSC) according to the regulations of Japanese Industrial Standards (JIS) K 7121.

It is preferable that the material for forming the resin A is an electrochemically-stable material that is electrically insulative, stable with respect to an electrolyte and furthermore, resistant against oxidation/reduction in an operation voltage range for the battery. The examples include polyethylene (PE), copolymer polyolefin or a polyolefin derivative (such as chlorinated polyethylene), polyolefin wax, petroleum wax, and carnauba wax. Examples of the copolymer polyolefin include an ethylene-vinyl-monomer copolymer, or more specifically, an ethylene-vinyl acetate copolymer (EVA) or ethylene acrylate copolymers such as an ethylene-methylacrylate copolymer and an ethylene-ethylacrylate copolymer. It is preferable that the structural unit derived from ethylene in the copolymer polyolefin is at least 85 mol %. Alternatively, polycycloolefin or the like can be used, and two or more of the above-mentioned materials can be included.

Among the above-described materials, PE, polyolefin wax, or EVA having at least 85 mol % of a structural unit derived from ethylene is used preferably. The resin A can contain various additives such as an antioxidant to be added to resin, as an ingredient in addition to the above-described materials.

A resin used for the ingredient of the resin B absorbs no or a restricted amount of electrolyte in an ordinary temperature range for a battery use (about 70° C. or lower), and thus the resin has a swelling degree of not more than a certain level. However, when heated to a temperature that requires a shutdown, the resin will absorb the electrolyte and swell considerably, and the swelling degree will be increased as the temperature rises. When the temperature is lower than the shutdown temperature, a liquid electrolyte not being absorbed by the resin B exists in the pores of the separator. Therefore, the conductivity of the Li ion in the separator is increased to provide a battery with a preferable load characteristic. In this specification, "load characteristic" denotes a high-rate discharging characteristic. When the resin is heated to a temperature of not lower than the temperature at which a characteristic to increase the swelling degree as the temperature rises (hereinafter, this may be referred to as "thermal swelling characteristic"), the resin B absorbs the electrolyte in the battery and swells considerably. The swollen particles close the pores of the separator and at the same time, the liquid electrolyte is decreased to cause lack of solution in the battery, so that a shutdown occurs to secure the safety of the battery. Moreover, when the temperature rises up to exceed the shutdown temperature, the lack of solution proceeds further due to the thermal swelling characteristic, and the reaction of the battery is suppressed further. Thereby, the safety with respect to high temperature after the shutdown can be improved further.

It is preferable that the temperature at which the resin B starts exhibiting the thermal swelling characteristic is 75° C. or higher. By setting the temperature to 75° C. or higher, it is possible to set a so-called shutdown temperature to be about 80° C. or higher. The shutdown temperature denotes a temperature at which the conductivity of the Li ion decreases considerably and the internal resistance of the battery increases. If the lower limit of the temperature for exhibiting the thermal swelling characteristic becomes higher, the shutdown temperature of the separator will be higher. Therefore, for setting the shutdown temperature to about 130° C. or lower, the lower limit of the temperature for presenting the thermal swelling characteristic is set to be 125° C. or lower preferably, and more preferably, 115° C. or lower. When the temperature for exhibiting thermal swelling characteristic is excessively high, there is a risk that the thermal runaway reaction of the active material in the battery cannot be suppressed sufficiently, and the effect of improving safety of the battery cannot be secured sufficiently. When the temperature for exhibiting thermal swelling characteristic is excessively low, the conductivity of the lithium ion may be lowered excessively in an ordinary use temperature range for a battery (about 70° C. or lower).

It is preferable that absorption of the electrolyte in the resin B is suppressed as much as possible and the resin B is swelled less at a temperature lower than the temperature exhibiting the thermal swelling characteristic. In a use temperature range for a battery, or at room temperature for example, the battery characteristics such as the load characteristic can be improved when the electrolyte is not absorbed by the resin B but held in a liquid state in the pores of the separator.

The volume of the electrolyte absorbed by the resin B at room temperature (25° C.) can be evaluated based on the swelling degree defined with the following Equation (1) expressing the volume change of the resin B.

$$B_R = (V_0/V_i) - 1 \tag{1}$$

In the equation, $V_0$ denotes the volume (cm$^3$) of the resin B after being dipped in an electrolyte at 25° C. for 24 hours, and $V_i$ denotes the volume (cm$^3$) of the resin B before being dipped in the electrolyte.

For the separator of the present invention, it is preferable that the swelling degree $B_R$ of the resin at room temperature (25° C.) is not more than 2.5, and more preferably, not more than 1. Namely, it is preferable that swelling due to absorption of the electrolyte is small, and that $B_R$ is as small as to approximate to zero. It is also preferable that at a temperature lower than the temperature exhibiting the thermal swelling, the change in the swelling degree according to the temperature is suppressed as much as possible.

Regarding the resin B in use, absorption of the electrolyte is increased when the resin B is heated over the lower limit of the temperature exhibiting the thermal swelling characteristic, and the swelling degree is increased as the temperature rises in a range of temperature for exhibiting thermal swelling characteristic. In a preferred example, the swelling degree $B_T$ defined with the following Equation (2) is at least 1 in a measurement at 120° C., and more preferably, at least 2.

$$B_T = (V_1/V_0) - 1 \quad (2)$$

In the above equation, $V_0$ denotes the volume (cm³) of the resin B after being dipped in an electrolyte at 25° C. for 24 hours, and $V_1$ denotes the volume (cm³) of the resin B after being dipped in an electrolyte at 25° C. for 24 hours, followed by steps of raising the temperature of the electrolyte to 120° C. and keeping the temperature at 120° C. for one hour.

When the swelling degree of the resin B as defined with Equation (2) is increased excessively, the battery may be deformed. Therefore, the swelling degree is not more than 10 preferably, and more preferably, not more than 5.

The swelling degree as defined by Equation (2) can be estimated by directly measuring the change in size of the resin B through a measurement such as a light-scattering method and an analysis of images taken by a CCD camera or the like. The swelling degree can be measured more accurately by the following method, for example.

A binder resin whose swelling degrees at 25° C. and at 120° C. have been known by the same definitions as in Equations (1) and (2) above is used as a solution or an emulsion. The resin B is mixed in the solution or the emulsion so as to prepare a slurry. The slurry is then applied on a base such as a polyethylene terephthalate (PET) sheet or a glass sheet to make a film, and the mass of the film is measured. Next, this film is dipped in a 25° C. electrolyte for 24 hours and the mass is measured. Further, the electrolyte is heated to 120° C. The electrolyte is kept at 120° C. for one hour to measure the mass of the resin, and the swelling degree $B_T$ is calculated on the basis of the following Equations (3) to (9). It should be noted that at the time of raising temperature from 25° C. to 120° C., the increases in volumes of ingredients other than the electrolyte are negligible in the following Equations (3) to (9).

$$V_i = M_i \times W/P_A \quad (3)$$

$$V_B = (M_0 - M_i)/P_B \quad (4)$$

$$V_C = M_1/P_C - M_0/P_B \quad (5)$$

$$V_V = M_i \times (1-W)/P_V \quad (6)$$

$$V_0 = V_i + V_B - V_V \times (B_B + 1) \quad (7)$$

$$V_D = V_V \times (B_B + 1) \quad (8)$$

$$B_T = \{V_0 + V_C - V_D \times (B_C + 1)\}/V_0 - 1 \quad (9)$$

In the above Equations (3) to (9):

$V_i$: volume (cm³) of resin B before being dipped in an electrolyte;

$V_0$: volume (cm³) of resin B after being dipped in an electrolyte at 25° C. for 24 hours;

$V_B$: volume (cm³) of an electrolyte absorbed in a film after dipping the film in the electrolyte at room temperature for 24 hours;

$V_C$: volume (cm³) of an electrolyte absorbed in a film during a period in which, after dipping the film in the electrolyte at room temperature for 24 hours, the temperature of the electrolyte is raised up to 120° C. and further kept at 120° C. for one hour;

$V_V$: volume (cm³) of a binder resin before being dipped in an electrolyte;

$V_D$: volume (cm³) of a binder resin after being dipped in the electrolyte at room temperature for 24 hours;

$M_i$: mass (g) of a film before being dipped in an electrolyte;

$M_0$: mass (g) of a film after being dipped in the electrolyte at room temperature for 24 hours;

$M_1$: mass (g) of a film after being dipped in an electrolyte at room temperature for 24 hours, followed by steps of raising the temperature of the electrolyte up to 120° C. and further keeping the electrolyte at 120° C. for one hour;

W: mass percentage of resin B in a film before being dipped in an electrolyte;

$P_A$: specific gravity (g/cm³) of resin B before being dipped in an electrolyte;

$P_B$: specific gravity (g/cm³) of an electrolyte at room temperature;

$P_C$: specific gravity (g/cm³) of an electrolyte at a predetermined temperature;

$P_V$: specific gravity (g/cm³) of a binder resin before being dipped in an electrolyte;

$B_B$: swelling degree of a binder resin after being dipped in an electrolyte at room temperature for 24 hours; and $B_C$: swelling degree of a binder resin at the time of temperature rising as defined by Equation (1) above.

The material used preferably for the resin B is electrochemically stable, namely it has both heat resistance and electric insulation, and the material is stable with respect to an electrolyte and resistant to oxidation/reduction in a range of operation voltage of the battery. Examples of the material include a crosslinked resin, and more specifically, a crosslinked substance of at least one resin selected from the group consisting of: styrene resins (such as polystyrene (PS)), styrene-butadiene copolymers, acrylic resins (such as polymethyl methacrylate (PMMA)), polyalkylene oxides (such as polyethylene oxide (PEO)), fluorine resins (such as polyvinylidene fluoride (PVDF)) and a derivative thereof, urea resins; and polyurethane. At least two of these resins can be used together. In addition to the above-described main ingredients, the resin B can contain various additives such as an antioxidant to be added to a resin as required.

Among the above-mentioned materials, crosslinked styrene resins, crosslinked acrylic resins and crosslinked fluorine resins are preferred, and crosslinked PMMA is used particularly preferably.

Although the mechanism by which such crosslinked resins absorb an electrolyte and swell as the temperature rises has not been clarified, it may relate to a glass transition temperature. That is, according to an estimate, since a typical resin is softened when heated to its glass transition temperature (Tg), the resin as described above has the capability of absorbing much electrolyte at or above a glass transition temperature and swell. Therefore, a material used for the resin B is preferred to have its glass transition temperature in a range of about 75° C. to about 125° C. when considering that a temperature at which an actual shutdown action occurs will be higher a little than the temperature at which the resin B starts to exhibit a thermal swelling characteristic. Commercially-available crosslinked resins have various glass transition temperatures. However, since the glass transition temperatures can be varied by controlling the crosslinking degrees of the materials for example, it is possible to use a material prepared to have a desired glass transition temperature.

Before the above-described crosslinked resin contains an electrolyte, namely, when the resin is in a so-called dry state, the volume change accompanying the temperature change has some reversibility. More specifically, even when the crosslinked resin swells due to the temperature rising, it contracts again by lowering the temperature. Moreover, since the heat-resistant temperature of the crosslinked resin is higher considerably than the temperature for exhibiting the thermal swelling characteristic, it is possible to select a material that can be heated to 200° C. or higher even when the lower limit of the temperature for exhibiting the thermal swelling characteristic is about 100° C. Therefore, even if heat is applied in a step of producing a separator for example, the resin will not melt or the thermal swelling characteristic of the resin will not be sacrificed, and the material can be handled in a simple manner in the production steps including an ordinary heating process. Moreover, since the separator of the present invention can be produced without applying intensive stress unlike a conventional separator formed of a porous film of polyethylene, there is substantially no residual stress after the production, and substantially no thermal contraction occurs in the porous base. Therefore, the safety at a high temperature can be improved from the viewpoint of the production method as well.

The resins A and B can be used alone respectively, or they can coexist. It is preferable that the content of the shutdown resin (volume percentage) is not less than 10 vol. %, more preferably not less than 20 vol. % of the whole ingredients of the separator, for realizing the shutdown effect more easily. From the viewpoint of securing the shape stability of the separator at high temperature, it is preferable that the content is not more than 80 vol. %, or more preferably not more than 40 vol. %.

The filler particles used in the present invention exist as at least one ingredient of the porous base forming the separator as in the above Embodiment (I), or they exist in the pores of the porous base as in the above Embodiment (II).

The filler particles can be either organic or inorganic. Fine particles are preferred from the viewpoint of dispersibility or the like, and inorganic fine particles are used preferably from the viewpoint of the stability or the like. Specific examples of ingredients of the inorganic particles include: inorganic oxides such as iron oxide, $SiO_2$, $Al_2O_3$, $TiO_2$, $BaTiO_2$ and $ZrO_2$; inorganic nitrides such as aluminum nitride and silicon nitride; slightly soluble ionic crystals such as calcium fluoride, barium fluoride and barium sulfate; covalent crystals such as silicon and diamond; and clays such as montmorillonite. Here, the inorganic oxides can be made from mineral resources such as boehmite, zeolite, apatite, kaoline, mullite, spinel and olivine, or artificial products thereof. The particles can be provided with electric insulation by coating the surface of the conductive material such as a metal, a conductive oxide such as $SnO_2$ and a tin-indium oxide (ITO) or carbonaceous materials such as carbon black and graphite with an insulative material such as the above-mentioned inorganic oxides. Among the inorganic oxides, $Al_2O_3$, $SiO_2$ and boehmite are used particularly preferably.

The shape of the filler particles can be substantially spherical or platy for example. From the viewpoint of prevention of short-circuit, plate-like particles are preferred. Representative examples of the plate-like particles include plate-like $Al_2O_3$ and plate-like boehmite. The diameter of the filler particles as the number-average diameter obtained through the above-mentioned measuring method is preferably 0.01 μm or larger for example, or more preferably, 0.1 μm or larger. The diameter is 15 μm or smaller preferably, and more preferably, 5 μm or smaller.

In a case of including the plate-like fine particles in a separator, the plate-shape surfaces of the fine particles can be oriented to be parallel to the film surface of the separator as much as possible by the method mentioned below for example. Thereby, it is possible to prevent effectively the occurrence of internal short-circuit caused by protrusion of an active material on the electrode surface or the lithium dendrite deposited on the electrode surface. In a case of plate-like particles, the aspect ratio (a ratio of the maximum length of the plate-like particles to the thickness of the plate-like particles) is for example, in a range of 2 to 100 preferably. The average diameter is not limited particularly as long as it is smaller than the thickness of the separator, and preferably it is not less than 1/100 of the separator's thickness. For the plate-like fine particles, other than the above-described inorganic fine particles, a resin material whose heat-resistant temperature is 150° C. or higher can be used as well. Two or more kinds of the above-described materials can be used together.

The porous base of the separator in Embodiment (I) is formed by integrating numbers of filler particles with a binder or the like. The binder used here is selected from EVA (having 20 to 35 mol % of a structural unit derived from vinyl acetate), ethylene-acrylic acid copolymers such as an ethylene-ethylacrylate copolymer, fluorine-based rubber, styrene-butadiene rubber (SBR), carboxymethyl cellulose (CMC), hydroxyethyl cellulose (HEC), polyvinyl alcohol (PVA), polyvinyl butyral (PVB), polyvinyl pyrrolidone (PVP), polyurethane, and epoxy resin. Particularly, a heat-resistant resin having a heat-resistant temperature of 150° C. or higher can be used preferably. Two or more of the above-described binders can be used together. When using any of these binders, the binder can be dissolved in a solvent of a liquid composition for forming the separator described below. Alternatively, the binder can be used in a dispersed emulsion form.

For securing the shape stability and flexibility of the separator, a fibrous material or the like can be mixed with the filler particles. The fibrous material is not limited particularly as long as it has a heat-resistant temperature of 150° C. or higher, being electrically insulative, stable electrochemically and also stable with respect to the electrolyte as described below or a solvent to be used in production of the separator. The "fibrous material" in this specification has an aspect ratio ('longitudinal length'/'width (diameter) in a direction crossing the longitudinal direction') is at least 4, and the aspect ratio is at least 10 preferably.

Specific examples of the fibrous material include: celluloses and the modifications (carboxy methyl cellulose (CMC), hydroxypropylcellulose (HPC) and the like); polyolefins (polypropylene (PP), a propylene copolymer and the like); polyesters (polyethylene terephthalate (PET), polyethylene naphthalate (PEN), polybutylene terephthalate (PBT) and the like); resins such as polyacrylonitrile (PAN), aramid, polyamide imide and polyimide; and inorganic oxides such as glass, alumina, zirconia and silica. At least two of these ingredients can be contained. The fibrous material can contain various additives as required. For example, in application to a resin, the fibrous material can contain an antioxidant or the like.

The porous base of the separator of Embodiment (II) is formed of a sheet as a woven fabric, nonwoven fabric or the like (including paper) of the fibrous material, and a commercially available nonwoven fabric or the like can be used for the base. The filler particles are contained in the pores of the porous base in a separator of this embodiment. The binder can be used for binding the porous base and the filler particles, or for binding the shutdown resin and the porous base.

Though the diameter of the fibrous material is not limited particularly as long as it is less than the thickness of the separator, the preferred diameter is in a range of 0.01 to 5 μm for example. When the diameter is too large, intertwinement of the fibrous material becomes insufficient. As a result, when a sheet is formed to provide a porous base, the strength is degraded causing a nuisance in handling. When the diameter is too small, the pores in the separator are decreased excessively, and the ionic permeability may be degraded to lower the load characteristic of the battery.

It is preferable that the content of the fibrous material in the separator of Embodiment (II) is 10 vol. % or more in the whole ingredients of the separator, more preferably 20 vol. % or more. It is preferable that the content is 90 vol. % or less, more preferably, 80 vol. % or less. It is preferable that the fibrous material is included in the separator in a state where the long axis has an angle of 30° or less in average with respect to the separator face, and more preferably, 20° or less.

For improving the effect of preventing the internal short-circuit, preferred content of the filler particles is at least 20 vol. % in the whole ingredients of the separator, and more preferably at least 50 vol. %. Preferably the content is suppressed not to exceed 80 vol. % for securing the content of the shutdown resin and to maintain the shutdown characteristic.

In the case of the separator of Embodiment (I), it is desirable that the contents of the filler particles and the binder are adjusted so that the percentage of the porous base will be not less than 10 vol. % and not more than 90 vol. % in the whole ingredients of the separator.

It is preferable that the separator has a thickness of not less than 3 μm for example, and more preferably not less than 5 μm; preferably not more than 30 μm, and more preferably not more than 20 μm, from the viewpoint of further improving the effect of preventing short-circuit of the battery, securing the strength of the separator, keeping the handleability, and also further increasing the energy density of the battery.

It is preferable that the porosity of the separator is 20% or more in a dry state for securing the liquid capacity for the electrolyte and improving the ionic permeability, and more preferably 30% or more. It is preferable from the viewpoint of securing the separator strength and preventing the internal short-circuit that the porosity of the separator is 70% or less, and more preferably, 60% or less. The porosity P (%) of the separator can be calculated on the basis of the total for the respective ingredients 'i' through the equation below, from the separator thickness, the mass per area, and density of the ingredient.

$$P=100-(\Sigma a_i/\rho_i)\times(m/t)$$

In the above equation, $a_i$: rate of the ingredient 'i' expressed with mass %; $\rho_i$: density of ingredient 'i' (g/cm$^3$); m: mass per unit area of the separator (g/cm$^2$); and t: separator thickness (cm).

In the separator including the resin B, there is no substantial problem if the resin B absorbs the electrolyte and swells to decrease the porosity of the separator a little after assembly of the battery. The porosity of the separator is 10% or more suitably.

Air permeability expressed as a Gurley value of the separator of the present invention is in a range of 10 to 300 sec preferably. Here, the Gurley value denotes a speed per second that air of 100 mL passes through a film under a pressure of 0.879 g/mm$^2$ in a measurement according to JIS P 8117. When the Gurley value is too large, the ionic permeability is decreased. When the Gurley value is too small, the strength of the separator may be decreased. Furthermore, it is preferable that the separator strength is 50 g or more with respect to a piercing strength in a case of using a needle having a diameter of 1 mm. When the piercing strength is too small, a short-circuit caused by piercing in the separator may occur when a dendrite crystal of the lithium is formed.

For the method of producing the separator of the present invention, any of the methods (a) and (b) below can be used, for example. The method (a) includes: applying a liquid composition (slurry or the like) containing the shutdown resin and the filler particles on a base of a separator or impregnating the base of separator with the same liquid composition, and subsequently drying at a predetermined temperature. Thereby, the separator as in Embodiment (II) above can be produced. Examples of the porous base used in this case include specifically a porous sheet of a woven fabric formed of at least one kind of fibrous material containing as the ingredients the respective materials as described above, or a nonwoven fabric configured by intertwining these fibrous materials with each other. More specific examples include a paper, a PP nonwoven fabric, a polyester nonwoven fabric (a PET nonwoven fabric, a PEN nonwoven fabric, a PBT nonwoven fabric and the like), and a PAN nonwoven fabric.

The liquid composition as described above contains a shutdown resin and filler particles and in addition, a binder as required, which are dispersed in a solvent (including a dispersion medium, hereinafter, the same). The binder may be dissolved in a solvent. The solvent used for the liquid composition is not limited particularly as long as it can disperse the shutdown resin and the filler particles homogeneously and that can dissolve or disperse the binder homogeneously. In general, organic solvents such as aromatic hydrocarbons like toluene, furans like tetrahydrofuran, and ketones like methyl ethyl ketone and methyl isobutyl ketone are used suitably. Alcohols (ethylene glycol, propylene glycol and the like) or various propylene oxide-based glycol ethers or the like such as monomethyl acetate can be added suitably to these solvents in order to control the surface tension. When the binder is water soluble, water can be used for the solvent in a case of use as an emulsion. Similarly in this case, alcohols (methyl alcohol, ethyl alcohol, isopropyl alcohol, ethylene glycol and the like) can be added suitably to control the surface tension.

It is preferable in the liquid composition that the contents of solids including the shutdown resin, the filler particles and the binder are in a range of 10 to 40 mass %, for example.

When the aperture diameter of the pores in the porous base is relatively large, for example, 5 μm or more, this often will result in a short-circuit. Therefore in this case, it is preferable in the structure that the filler particles are present at least partially in the pores of the base. It is more preferable that at least some of the ingredients (such as the shutdown resin) other than the filler particles are present together with the filler particles in the pores of the base.

In a case of adding plate-like particles to the separator, for improving the orientation and functioning effectively, it is possible for example that the base impregnated with the liquid composition is applied with shear or a magnetic field.

For exhibiting the effects of the respective ingredients more efficiently, the ingredients can be distributed unevenly to cohere as a layer parallel to the film face of the separator. In a method employed for this purpose, for example, two heads or rollers of a die-coater or a reverse roll-coater are used to coat separate paints (for example, a liquid composition based on a shutdown resin and a liquid composition based on the filler particles) from both directions (surface and back face) of the base separately, and drying.

In a method (b) for producing the separator of the present invention, a fibrous material is added further to the liquid composition as required, which is then applied on a substrate such as a film and a metal foil and dried at a predetermined temperature and peeled off from this substrate. The separator of Embodiment (I) can be produced by the method (b). It is preferable that the liquid composition used in the method (b) contains solids including the fibrous material in a range of 10 to 40 mass %, for example. Alternatively, in the method (b), it is possible to form a separator on a surface of at least either of the positive electrode and the negative electrode forming the battery so as to provide a structure where the separator and the electrodes are integrated with each other.

The separator of the present invention will not be limited to the respective structures as described above. For example, the shutdown resin can be present as particles separately and independently, and the shutdown resin can be fused partially to each other or to a fibrous material or the like. There is no particular limitation for the electrochemical device to which the separator of the present invention is applied as long as a nonaqueous electrolyte is used. The separator can be applied to not only a lithium secondary battery but to a lithium primary battery, a supercapacitor or the like where safety at high temperature is required.

Hereinafter, application to a lithium secondary battery will be described below as an example of the present invention. The lithium secondary battery can be formed, for example, as a cylinder (with or without angles) using a steel can, aluminum can or the like as an outer package. Alternatively, it can be a soft package battery using as an outer package a metal deposition laminate film.

There is no particular limitation for the positive electrode as long as it is the positive electrode used for a conventional lithium secondary battery, i.e., a positive electrode containing an active material that can occlude and emit Li. For the positive active material, it is possible to use, for example, a lithium-containing transition metal oxide having a layer structure expressed as $Li_{1+x}MO_2$ ($-0.1<x<0.1$; M: Co, Ni, Mn, Al, Mg and the like); a lithium-manganese oxide having a spinel structure such as $LiMn_2O_4$ in which a part of the elements is substituted by another element; and an olivine-type compound expressed as $LiMPO_4$ (M: Co, Ni, Mn, Fe and the like). Specific examples of the lithium-containing transition metal oxide having a layer structure include $LiCoO_2$, $LiNi_{1-x}Co_{x-y}Al_yO_2$ ($0.1 \leq x \leq 0.3$, $0.01 \leq y \leq 0.2$), and also an oxide containing at least Co, Li and Mn ($LiMn_{1/3}Ni_{1/3}Co_{1/3}O_2$, $LiMn_{5/12}Ni_{5/12}Co_{1/6}O_2$, $LiMn_{3/5}Ni_{1/5}Co_{1/5}O_2$ and the like).

To the positive active material, a carbon material such as carbon black as a conductive auxiliary and a fluorine resin such as polyvinylidene fluoride (PVDF) as a binder are added to prepare a positive mixture. This positive mixture is used to form a compact (positive mixture layer) on a surface of a collector.

For the positive collector, a foil of metal such as aluminum, a punching metal, a metal mesh, an expanded metal and the like can be used. In general, an aluminum foil 10 to 30 μm in thickness is used preferably.

The lead portion at the positive electrode side is provided generally by keeping an exposed part of the collector without forming the positive mixture layer during the production of the positive electrode. However, the lead portion is not necessarily integrated with the collector at the beginning, but it can be provided by connecting later a foil of aluminum to the collector.

The negative electrode is not limited particularly as long as it is a negative electrode to be used for a conventional lithium secondary battery, that is, a negative electrode containing an active material that can occlude and emit Li. The negative active material are carbon-based materials that can occlude and emit lithium, and it can be used alone or combined with at least one of the other materials, and the examples include: graphite, pyrolytic carbons, cokes, glassy carbons, a calcined organic polymer compound, mesocarbon microbeads (MCMB), and carbon fibers. Alternative materials that can be used as the negative active materials include: metals such as Si, Sn, Ge, Bi, Sb, In and the alloy; compounds such as a lithium-containing nitride, and a lithium-containing oxide that can be charged/discharged at a voltage as low as that of a lithium metal, a lithium metal and a lithium/aluminum alloy.

A carbon material like carbon black as a conductive auxiliary and PVDF as a binder are added suitably to the negative active material for preparing a negative mixture, and this negative mixture is used for forming a compact (negative mixture layer) on a surface of the collector. When any of the above-described alloys or the lithium metal is used for the negative active material, a foil of any of the various alloys or the lithium metal can be used alone, and furthermore, these foils can be laminated on the collector in use.

When the collector is used for the negative electrode, a foil of copper or nickel, a punching metal, a metal mesh, an expanded metal or the like can be used for the collector. In general, a copper foil is used. Regarding the negative collector, when the entire thickness of the negative electrode is decreased for obtaining a battery of a high energy density, preferably the upper limit of the thickness is 30 μm and the lower limit is 5 μm. The lead portion at the negative electrode side can be formed similarly to the lead portion at the positive electrode side.

The electrode used here can be prepared as a laminate formed by laminating the positive electrode and the negative electrode with the separator of the present invention interposed therebetween, or as a wound electrode of the laminate.

For the nonaqueous electrolyte, a solution prepared by dissolving lithium salt in an organic solvent is used. The lithium salt is not limited particularly as long as it dissociates in the solvent and forms a $Li^+$ ion while merely causing any side reaction such as decomposition in a voltage range applied for the battery. The examples include inorganic lithium salts such as $LiClO_4$, $LiPF_6$, $LiBF_4$, $LiAsF_6$, and $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, and $LiC_nF_{2n+1}SO_3$ ($n \geq 2$), $LiN(RfOSO_2)_2$ (here, Rf denotes a fluoroalkyl group).

The organic solvent used for the nonaqueous electrolyte will not be limited particularly as long as it dissolves the lithium salt and does not cause a side reaction such as decomposition in a voltage range applied for the battery. The examples include: cyclic carbonates such as ethylene carbonate, propylene carbonate, butylene carbonate and vinylene carbonate; chain carbonates such as dimethyl carbonate, diethyl carbonate and methyl ethyl carbonate; chain esters such as methyl propionate; cyclic esters such as γ-butyrolactone; chain ethers such as dimethoxyethane, diethyl ether, 1,3-dioxolane, diglyme, triglyme and tetraglyme; cyclic ethers such as dioxane, tetrahydrofuran and 2-methyltetrahydrofuran; nitryls such as acetonitrile, propionitrile and methoxypropionitrile; and sulfites such as ethylene glycol sulfite. Any of these solvents can be mixed with at least one of the other solvents in use. For obtaining a battery having further preferable characteristics, use of a combination of solvents for obtaining a high conductance, such as a mixed solvent of ethylene carbonate and a chain carbonate, is preferred. Additives such as vinylene carbonates, 1,3-propanen sultone, diphenyl disulfide, cyclohexylbenzene, biphenyl, fluorobenzene and t-butylbenzene can be added suitably to the nonaqueous electrolytes in order to improve safety, charging/discharging cyclic performance, and a high-temperature storage characteristic.

It is preferable that the concentration of the lithium salt in the nonaqueous electrolyte is in a range of 0.5 to 1.5 mol/L, and more preferably, 0.9 to 1.25 mol/L.

The present invention will be described in detail below by referring to Examples, though the present invention will not be limited to the following Examples. The swelling degrees $B_R$ and $B_T$ of the resin B in Examples denote swelling degrees calculated on the basis of Equations (1) and (2) above.

<Production of Negative Electrode>

95 mass parts of graphite as a negative active material and 5 mass parts of PVDF as a binder were mixed homogeneously in a solvent of N-methyl-2-pyrrolidone (NMP) so as to prepare a paste containing a negative mixture. This paste containing a negative mixture was applied intermittently on the both faces of a collector of a copper foil 10 μm in thickness so that the length of the applied active material was 320 mm on the surface and 260 mm on the back face, which was dried subsequently. Later, calendering was carried out for adjusting the thickness of the negative mixture layer so that the entire thickness of the negative electrode would be 142 μm, which was then cut to be 45 mm in width, and thus a negative electrode 330 mm in length and 45 mm in width was produced. Further, a tab was welded to the exposed part of the copper foil of this negative electrode so as to form a lead portion.

<Production of Positive Electrode>

85 mass parts of $LiCoO_2$ as a positive active material, 10 mass parts of acetylene black as a conductive auxiliary and 5 mass parts of PVDF as a binder were mixed in a solvent of NMP homogeneously so as to prepare a paste containing a positive mixture. This paste was applied intermittently on the both faces of a collector of an aluminum foil 15 μm in thickness so that the length of the applied active material would be 319 to 320 mm on the surface and 258 to 260 mm on the back face, which was dried subsequently. Later, calendering was carried out for adjusting the thickness of the positive mixture layer so that the entire thickness of the positive electrode would be 150 μm, which was then cut to 43 mm in width, and thus a positive electrode 330 mm in length and 43 mm in width was produced. Further, a tab was welded to the exposed part of the aluminum foil of this positive electrode so as to form a lead portion.

The negative electrode and the positive electrode will be used for production of the battery as described below.

<Production and Evaluation of Separator>

Example 1

2 kg of an aqueous dispersion of a polyethylene powder (resin A) ("CHEMIPEARL W-700" (trade name) manufactured by Mitsui Chemicals, Inc.) and 800 g of ethanol were introduced into a container and dispersed by stirring with a disperser on the condition of 2800 rpm for one hour. 300 g of alumina ($Al_2O_3$) fine particles as filler particles ("SUMI-CORUNDUM AA04" (trade name) manufactured by Sumitomo Chemical; heat-resistant temperature: 180° C. or higher; average particle diameter: 0.4 μm; particle size distribution: 0.3 to 0.7 μm) were added to the dispersion, and the dispersion was further stirred for three hours to provide homogeneous slurry. In this slurry, a nonwoven fabric of PBT (manufactured by TAPYRUS CO., LTD.) 28 μm in thickness for making a porous base was introduced, pulled out for applying the slurry, and dried. The thus obtained separator was 35 μm in thickness, and it had the resin A and the filler particles both being contained in the pores of the nonwoven fabric.

Example 2

100 g of an ethylene-vinyl acetate copolymer (EVA) as a binder (having 34 mol % of a structural unit derived from vinyl acetate and manufactured by NIPPON UNICAR CO., LTD.) was introduced with 6 kg of toluene as a solvent into a container and stirred at room temperature so that it was dissolved homogeneously to obtain a binder solution. To this binder solution, 1 kg of a polyethylene powder as resin A ("FLOWBEADS LE1080" (trade name) manufactured by SUMITOMO SEIKA CHEMICALS CO., LTD.; melting point: 107° C.; average particle diameter: 6 μm; particle size distribution: 2 to 15 μm) was added and dispersed by stirring with a disperser on the condition of 2800 rpm for one hour. To this, 1 kg of a polypropylene powder as filler particles ("PPW-5" (trade name) manufactured by SEISHIN ENTERPRISE CO., LTD.) was added and stirred with a disperser on the condition of 2800 rpm for three hours so as to obtain a homogenous slurry. This slurry was rub-applied on a paper 25 μm in thickness (manufactured by NIPPON KODOSHI CORPORATION) with a gap of 50 μm, and the solvent was removed so as to obtain a separator 35 μm in thickness.

Example 3

750 g of an aqueous dispersion of the polyethylene power as in Example 1, 200 g of isopropyl alcohol (IPA), and 375 g of polyvinyl butyral (PVB) as a binder ("S-LEC KX-5" (trade name) manufactured by Sekisui Chemical) were introduced into a container and dispersed by stirring with a disperser on the condition of 2800 rpm for one hour. To this, 300 g of plate-like boehmite fine particles as filler particles ("BMM" (trade name) manufactured by KAWAI LIME) was added and stirred for three hours to provide a homogeneous slurry. A nonwoven fabric of PP (manufactured by NIPPON KODOSHI CORPORATION) 15 μm in thickness was introduced into this slurry and pulled out for applying the slurry, and dried to obtain a separator 20 μm in thickness.

Example 4

1 kg of crosslinked PMMA fine particles as resin B ("GANZPEARL 0104" (trade name) manufactured by GANZ CHEMICAL CO., LTD.; average particle diameter: 1 μm; Tg=about 120° C.; $B_R$=0.5; $B_T$=2.3), 800 g of water, 200 g of isopropyl alcohol (IPA), and also 375 g of PVB as a binder as in Example 3 were introduced into a container, and dispersed by stirring with a disperser on the condition of 2800 rpm for one hour. To this, 3 kg of alumina fine particles as filler particles as in Example 1 and 750 g of the above-described binder (PVB) were added and stirred for three hours to provide a homogenous slurry. A nonwoven fabric of PBT (manufactured by TAPYRUS CO., LTD.) 28 μm in thickness was introduced into this slurry and pulled out for applying the slurry, and dried to obtain a separator 35 μm in thickness.

Example 5

300 g of SBR latex ("TRD-2001" (trade name) manufactured by JSR) and 30 g of CMC ("2200" manufactured by Daicel Chemical Industries Ltd.) both as binders and 4 kg of water were introduced into a container, and stirred at room temperature until it dissolved homogeneously. Further, 2.5 kg of an aqueous dispersion of crosslinked PMMA fine particles (resin B) ("STUFFYLLOYD" (trade name) manufactured by GANZ CHEMICAL CO., LTD.; average particle diameter: 0.3 μm; $B_R$=1.2; $B_T$=1.2) was added and dispersed by stirring with a disperser on the condition of 2800 rpm for one hour. To this, 3 kg of filler particles as in Example 3 (plate-like boehmite fine particles) was added and dispersed by stirring with a disperser on the condition of 2800 rpm for three hours to provide a homogenous slurry. This slurry was rub-applied on a nonwoven fabric of PP (manufactured by JAPAN Viline COMPANY, LTD) 23 μm in thickness with a gap of 50 μm by using an applicator, and dried to obtain a separator 30 μm in thickness.

Example 6

To the same slurry as in Example 5, 1 kg of an aqueous dispersion of a polyethylene powder as resin A as in Example 1 was added further and dispersed by stirring with a disperser on the condition of 2800 rpm for one hour. A separator 30 μm in thickness was obtained in the same manner as in Example 5.

Example 7

A slurry was prepared by adding 3 kg of plate-like alumina fine particles ("SERAPH" (trade name) manufactured by KINSEI MATEC CO., LTD.) in place of the alumina fine particles of Example 4. This was rub-applied on a nonwoven fabric of PET (manufactured by Freudenberg Co., Ltd.) 15 μm in thickness with a gap of 50 μm. A separator 20 μm in thickness was obtained in the same manner as in Example 4 other than the above-described steps.

Example 8

100 g of an emulsion of an ethylene-vinyl acetate copolymer (EVA) as a binder ("SUTNKAFLEX S850HQ" (trade name) manufactured by SUMIKA CHEMTEC CO., LTD.; having 20 mol % of a structural unit derived from vinyl acetate) was added to 3 kg of aqueous dispersion of a polyethylene powder (resin A) ("AB-50" (trade name) manufactured by GIFU SHELLAC), and dispersed by stirring with a disperser on the condition of 2800 rpm for one hour. To this, 1.5 kg of alumina fibers as filler particles ("DENKA ALCEN B100" (trade name) manufactured by Denki Kagaku Kogyo K.K.) was added and stirred to be homogenized at room temperature. This slurry was applied on the PET base by using a die-coater to have a thickness of 50 μm, dried and peeled off from the PET base, so that a separator 15 μm in thickness having a porous base formed of the alumina fibers and the polyethylene powder was obtained.

In an observation of the cross section of the thus produced separator by using a scanning electron microscope, the aspect ratio of the alumina fibers is 10 or more, and the average angle with respect to the separator face was 10° or less.

Example 9

A separator 15 μm in thickness was obtained in the same manner as in Example 8 except that the aqueous dispersion of polyethylene powder in Example 8 was replaced by 1 kg of an aqueous dispersion of crosslinked PMMA fine particles (resin B) as in Example 5, and 2 kg of water was added for the solvent.

Example 10

100 g of EVA as a binder (having 34 mol % of a structural unit derived from vinyl acetate; manufactured by NIPPON UNICAR CO., LTD.) was introduced together with 6 kg of toluene as a solvent into a container, stirred at room temperature to be dissolved homogeneously, thereby a binder solution was obtained. Next, 500 g of a polyethylene powder as resin A ("FLOWBEADS LE1080" (trade name) manufactured by SUMITOMO SEIKA CHEMICALS CO., LTD.) was added to the binder solution, and dispersed by stirring with a disperser on the condition of 2800 rpm for one hour. 2 kg of alumina fine particles as filler particles as in Example 1 was added to this dispersion and dispersed by stirring with a disperser on the condition of 2800 rpm for three hours, thereby a homogeneous liquid composition for forming a separator was obtained. This slurry was rub-applied on the active material layers on both faces of the above-described negative electrode through a gap of 50 μm, and then dried to form a separator 15 μm in thickness and integrated with the negative electrode on the surface of the negative electrode.

Figure 1:
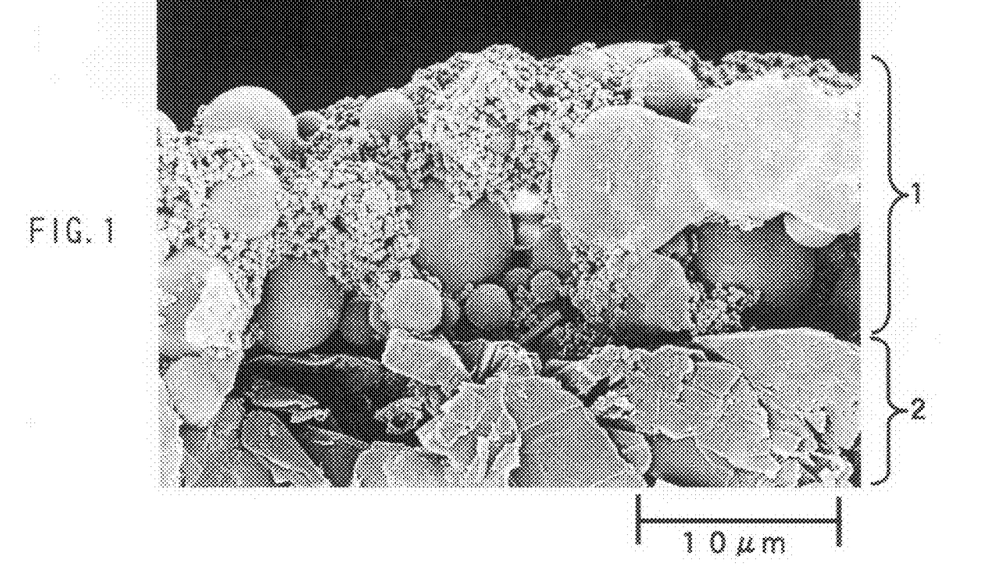
FIG. 1 is an image of a cross section of a negative electrode in Example 10, taken with a scanning electron microscope.
Figure 2:
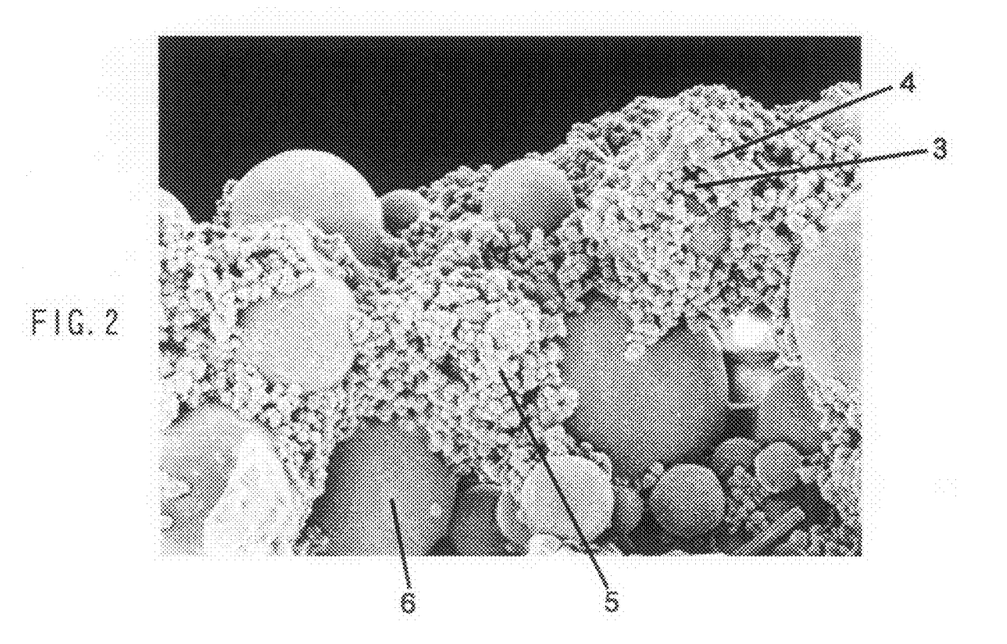
FIG. 2 is an enlarged image of a separator portion in FIG. 1, taken with a scanning electron microscope.

FIG. 1 is a photograph of the cross section of the negative electrode taken with a scanning electron microscope, and FIG. 2 is an enlarged photograph of the separator part. In FIG. 1, numerals 1 and 2 denote respectively a separator and a negative electrode. In FIG. 2, numerals 3, 4, 5 and 6 denote a filler particle, a binder, a porous base and a shutdown resin, respectively. The photographs of FIGS. 1 and 2 show that the separator 1 formed of the porous base 5 formed of the filler particles 3 and the binder 4, and the shutdown resin 6, are formed on the negative electrode 2.

Example 11

A separator was formed on the surfaces of the negative electrode in the same manner as in Example 10 except that the amount of the polyethylene powder was changed to 2 kg.

Example 12

A separator was formed on the surfaces of the negative electrode in the same manner as in Example 10 except that the amount of the polyethylene powder was changed to 1 kg.

Example 13

A separator was formed on the surfaces of the negative electrode in the same manner as in Example 10 except that the amount of the alumina fine particles was changed to 400 g and furthermore the amount of the polyethylene powder was changed to 1 kg.

Example 14

A separator was formed on the surfaces of the negative electrode in the same manner as in Example 10 except that the filler particles were changed to 1 kg of crosslinked PMMA fine particles ("GANZPEARL 0407" (trade name) manufactured by GANZ CHEMICAL CO., LTD; heat-resistant temperature: 180° C. or higher) and furthermore the amount of the polyethylene powder was changed to 1 kg. Regarding the crosslinked PMMA used in this Example, the crosslinking degree of the resin was improved in advance for preventing the particles from absorbing the electrolyte and swelling, thereby improving the stability with respect to the electrolyte.

Example 15

200 g of an ethylene-ethyl acrylate copolymer as a binder ("NUC 6570" (trade name) manufactured by NIPPON UNICAR CO., LTD.) was introduced together with 6 kg of toluene as a solvent into a container, and stirred to dissolve homogeneously at room temperature so that a binder solution was obtained. Next, 1 kg of an EVA powder as resin A (having 10 mol % of a structural unit derived from vinyl acetate; "FLOWBACK D5020" (trade name) manufactured by SUMITOMO SEIKA CHEMICALS CO., LTD.; melting point: 89° C.; average particle diameter: 10 μm; particle size distribution: 5 to 20 μm) was added to the binder solution and dispersed by stirring with a disperser on the condition of 2800 rpm for one hour. To this, 400 g of alumina fine particles as filler particles as in Example 1 were added. Subsequently, in the same manner as in Example 10, a separator 20 μm in thickness and integrated with the negative electrode was formed on the surface of the negative electrode.

Comparative Example 1

A commercially available microporous film of polyethylene 20 μm in thickness was used for the separator in Comparative Example 1.

Comparative Example 2

3 kg of alumina fine particles as the filler particles as in Example 1, 800 g of water, 200 g of isopropyl alcohol (IPA) and 375 g of PVB as the binder as in Example 3 were introduced into a container and dispersed by stirring with a disperser on the condition of 2800 rpm for one hour so as to obtain a homogeneous slurry. In this slurry, a nonwoven fabric of PP 15 μm in thickness (manufactured by NIPPON KODOSHI CORPORATION) was introduced and pulled out for applying the slurry, and dried to obtain a separator 20 μm in thickness.

Comparative Example 3

A separator 20 μm in thickness was obtained in the same manner as in Comparative Example 2 except that the alumina fine particles were replaced by the aqueous dispersion of the polyethylene powder (resin A) as in Example 1.

Table 1 shows the constitutions of the separators in the above Examples 1-15 and Comparative Examples 1-3.

TABLE 1

| Separator | Shutdown resin | | Filler particles | Porous base |
| | Resin A | Resin B | | |
|---|---|---|---|---|
| Example 1 | Polyethylene | — | Alumina | PBT nonwoven fabric |
| Example 2 | Polyethylene | — | Polypropylene | Paper |
| Example 3 | Polyethylene | — | Plate-like boehmite | PP nonwoven fabric |
| Example 4 | — | Crosslinked PMMA | Alumina | PBT nonwoven fabric |
| Example 5 | — | Crosslinked PMMA | Plate-like boehmite | PP nonwoven fabric |
| Example 6 | Polyethylene | Crosslinked PMMA | Plate-like boehmite | PP nonwoven fabric |
| Example 7 | — | Crosslinked PMMA | Plate-like alumina | PET nonwoven fabric |
| Example 8 | Polyethylene | — | Alumina fibers | Alumina fibers |
| Example 9 | — | Crosslinked PMMA | Alumina fibers | Alumina fibers |
| Example 10 | Polyethylene | — | Alumina | Alumina fine particles |
| Example 11 | Polyethylene | — | Alumina | Alumina fine particles |
| Example 12 | Polyethylene | — | Alumina | Alumina fine particles |
| Example 13 | Polyethylene | — | Alumina | Alumina fine particles |
| Example 14 | Polyethylene | — | Crosslinked PMMA | Crosslinked PMMA fine particles |
| Example 15 | EVA | — | Alumina | Alumina fine particles |
| Com. Ex. 1 | — | — | — | PE microporous film |
| Com. Ex. 2 | — | — | Alumina | PP nonwoven fabric |
| Com. Ex. 3 | Polyethylene | — | — | PP nonwoven fabric |

\* Com. Ex.: Comparative Examples

Regarding each of the thus produced separators, the contraction rate and the shutdown temperature were measured by the following method.

The separators according to Examples 1-9 and Comparative Examples 1-3 were divided respectively into a size of 4 cm×4 cm and interposed between two stainless steel plates fixed with a clip. These were kept in a thermostat of 150° C. for 30 minutes. Then the separators were taken out from the thermostat and the length of each separator piece was measured and subjected to a comparison with the length before the test, and the decreasing rate was calculated as the contraction rate of the separator.

Regarding the separators integrated with the electrodes as in Examples 10-15, they were kept with the electrodes in a 150° C. thermostat for 60 minutes. Later they were taken out from the thermostat and the length of the long side of each separator was compared with the length before the heating in order to calculate the contraction rate. The contraction rates of the respective separators are shown in Table 2.

TABLE 2

| Separator | Contraction rate (%) |
| --- | --- |
| Example 1 | 0.1 |
| Example 2 | 0 |
| Example 3 | 2 |
| Example 4 | 1 |
| Example 5 | 2 |
| Example 6 | 1 |
| Example 7 | 2 |
| Example 8 | 0.5 |
| Example 9 | 2 |
| Example 10 | 0 |
| Example 11 | 0 |
| Example 12 | 0 |
| Example 13 | 0 |
| Example 14 | 0 |
| Example 15 | 0 |
| Comparative Example 1 | 35 |
| Comparative Example 2 | 1 |
| Comparative Example 3 | 1 |

The air permeability of the separator in each of Examples 1-9 and Comparative Examples 1-3 at room temperature was measured by the method according to JIS P 8117 so as to calculate the Gurley value, namely, the time (second) for 100 mL air to pass through the film under pressure of 0.879 g/mm$^2$ (8620 Pa). Furthermore, for the separators in Examples 1-3, 8 and Comparative Examples 1-3, changes in the Gurley values were measured by the following method in a range of 80 to 150° C. Each separator was kept in a 80° C. thermostat for 10 minutes. Then, the separators were taken out from the thermostat and cooled slowly to room temperature, so that the Gurley values after the heating to 80° C. was measured by the above-described method. Subsequently, the temperature was raised by 5° C. up to 150° C. and the separators were kept at each temperature for 10 minutes so as to measure the Gurley value in the above-mentioned manner. On the basis of the change in the thus calculated Gurley values according to temperature, a temperature where the Gurley value exceeds 1×10$^4$ sec/100 mL was determined as the shutdown temperature for the separator. For the separator in Comparative Example 2, a shutdown did not occur, and thus measurement of the shutdown temperature failed.

For the separators in Examples 4-7 and 9, the shutdown temperatures were calculated in the following manner. Each separator being cut to a piece of 4 cm×4 cm was clipped with two stainless steel plates having a terminal, and it was inserted into a bag of an aluminum-laminated film. After injecting a nonaqueous electrolyte, the bag was sealed in a state where the tip of the terminal extruding outside the bag so as to form a test sample. The nonaqueous electrolyte used here was a solution prepared by dissolving LiPF$_6$ to have a concentration of 1.2 mol/L in a solvent as a mixture of ethylene carbonate and ethyl methyl carbonate at a volume ratio of 1:2. This nonaqueous electrolyte will be used also in production of a battery as mentioned below.

The samples were introduced into the thermostat and the temperature was raised from the room temperature by 1° C. per minute, and at the same time, a contact ohmmeter "3560 AC MILLIOHM HITESTER" (trade name) manufactured by HIOKI E.E. CORPORATION was used to measure the resistance value at application of AC of 1 kHz to the terminal, so that the change of the internal resistance according to the temperature was calculated. The shutdown temperature of each of the separators was determined as the temperature where the resistance value becomes 10 times or more the value at room temperature.

Table 3 shows the Gurley values and the shutdown temperatures for the separators in Examples 1-9 and Comparative Examples 1-3.

TABLE 3

| Separator | Gurley value (sec/100 mL) | Shutdown temperature (° C.) |
| --- | --- | --- |
| Example 1 | 120 | 125 |
| Example 2 | 250 | 105 |
| Example 3 | 110 | 125 |
| Example 4 | 80 | 120 |
| Example 5 | 60 | 105 |
| Example 6 | 80 | 105 |
| Example 7 | 70 | 105 |
| Example 8 | 90 | 125 |
| Example 9 | 100 | 105 |
| Comparative Example 1 | 150 | 140 |
| Comparative Example 2 | 90 | Not measured |
| Comparative Example 3 | 110 | 125 |

Regarding the separators integrated with the electrodes as in Examples 10-15, the shutdown temperatures were calculated by measuring the changes of the internal resistances of the batteries according to the temperatures after assembly of the batteries, as mentioned below.

<Production and Evaluation of Battery>

Each of the separators in Examples 1-9 and Comparative Examples 1-3 was wound spirally with the above-described positive electrode and negative electrode to produce a wound electrode. This wound electrode was crushed and flattened to be loaded in a battery container. After injection of the above-described nonaqueous electrolyte, the container was sealed to produce a lithium secondary battery as in any of Examples 1A-9A and Comparative Examples 1A-3A.

The separators in Examples 10-15, which were integrated with negative electrodes, were processed similarly to Examples 1A-9A and Comparative Examples 1A-3A except that the negative electrodes and the positive electrodes were overlapped through the separators so as to produce the lithium secondary batteries in Examples 10A-15A.

First, regarding the lithium secondary batteries of Examples 10A-15A, the shutdown temperatures of the separators used in the respective batteries were calculated by the following method. The batteries were introduced into a thermostat and heated by raising the temperature from 30° C. to 150° C. by 1° C. per minute in the same manner as in the case of measurement of the internal resistance for the single use of the separator, thereby the change of the internal resistance of the battery according to the temperature was calculated. The shutdown temperature of each of the separators was determined as the temperature where the resistance value was raised to be 5 times or more of the value at 30° C. For comparison with the method of calculating the shutdown temperature depending on the change in the Gurley value, the change of the internal resistance of the battery according to the temperature in Comparative Example 1A was calculated in the same manner so as to calculate the shutdown temperature of the separator in Comparative Example 1. Substantially the same results were obtained for both the methods. Regarding the battery in Comparative Example 3A, the change in the internal resistance according to temperature was measured in the similar manner, but it was found that internal short-circuit had occurred during production of the battery, and thus an evaluation result for the battery was not obtained. It is considered that since the filler particles did not form the porous base and the separator had no filler particles in the pores of the porous base in the separator in Comparative Example 3, the strength of the separator was poor and thus the internal short-circuit occurred during production of the battery.

Figure 3:
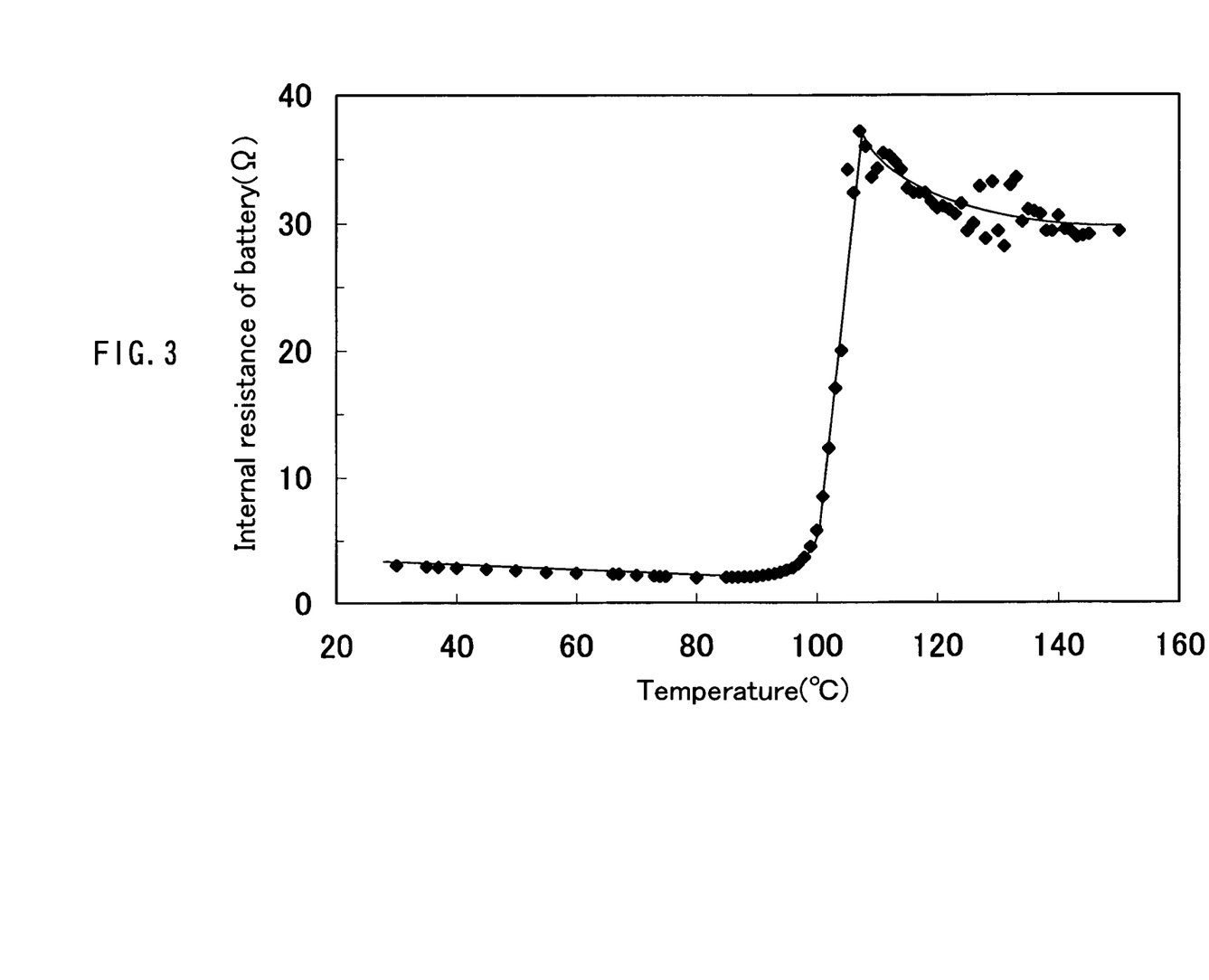
FIG. 3 is a graph showing an internal resistance that changes according to temperature in Example 12A.
Figure 4:
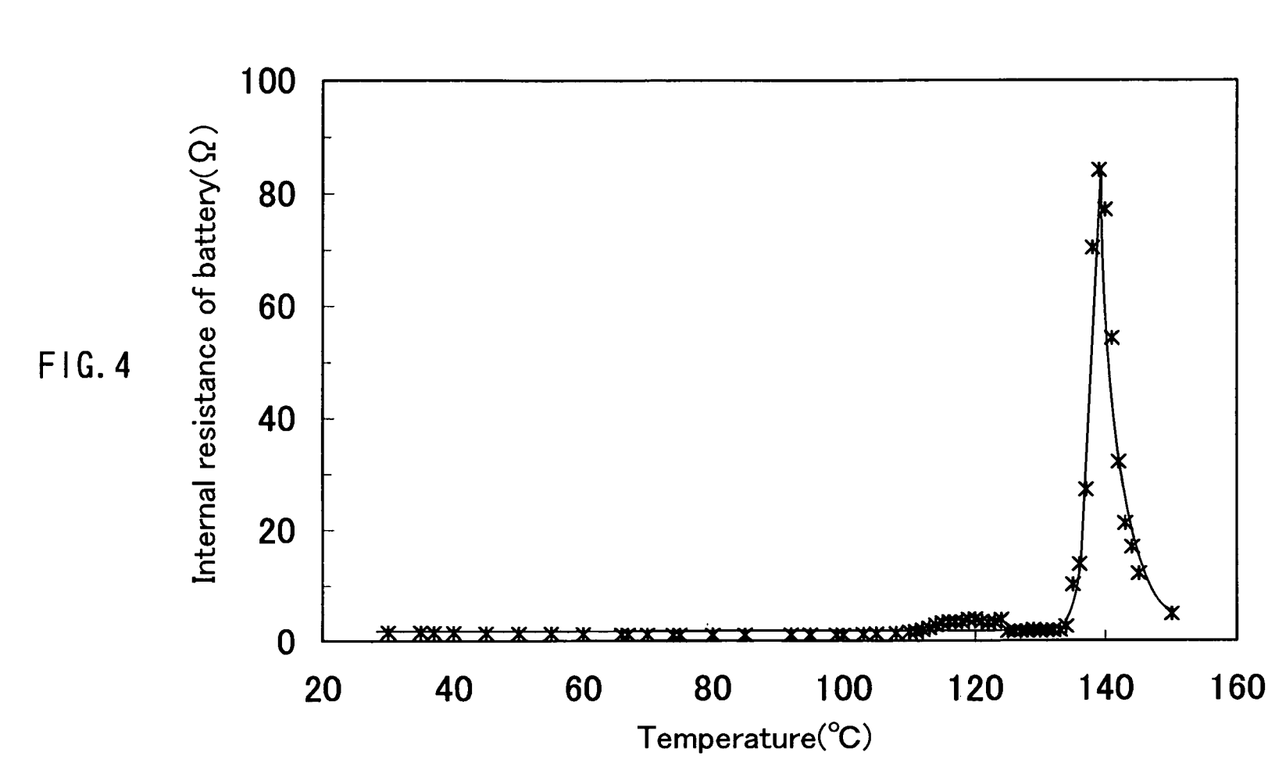
FIG. 4 is a graph showing an internal resistance that changes according to temperature in Comparative Example 1A.

The results of the measurements are shown in Table 4. And the changes according to the temperatures of the internal resistances in Example 12A and Comparative Example 1A are shown in FIGS. 3 and 4.

TABLE 4

| Battery | Separator | Shutdown temperature (° C.) |
|---|---|---|
| Example 10A | Example 10 | 106 |
| Example 11A | Example 11 | 103 |
| Example 12A | Example 12 | 103 |
| Example 13A | Example 13 | 106 |
| Example 14A | Example 14 | 106 |
| Example 15A | Example 15 | 90 |
| Comparative Example 1A | Comparative Example 1 | 136 |

Tables 3 and 4 show that, regarding the separators in Examples 1-15 of the present invention, the shutdown temperatures are in a range of 90 to 125° C., namely, a shutdown occurs in a temperature range suitable for securing safety of the battery at high temperature. On the other hand, the shutdown temperature for the separator in Comparative Example 1 exceeded 130° C., and thus the shutdown occurred at a temperature closer to the thermal runaway temperature of the battery. For the separator in Comparative Example 2, no shutdown occurred because the separator had no shutdown resin.

Moreover, as shown in Table 2, the separators in Examples 1-15 of the present invention contracted very little after heated to exceed the shutdown temperature. In contrast, the separator in Comparative Example 1 contracted considerably after the temperature's exceeding the shutdown temperature. Therefore, as shown in FIG. 3, for the battery in Example 12A, the shutdown state was retained without decreasing the internal resistance until the temperature reached 150° C., and thus the safety after the shutdown was maintained. On the other hand, for the battery in Comparative Example 1A, the internal resistance was lowered abruptly due to contraction of the separator, resulting in a condition where an internal short-circuit might occur easily.

Next, regarding the batteries in Examples 1A-4A, 8A, 10A-15A and Comparative Example 1A, charging-discharging was carried out on the condition below to measure the load characteristics. For the charging, 'constant current'-'constant voltage' charging was employed. Namely, a constant current charging was conducted with a current value of 0.2 C until the battery voltage reached 4.2 V, and subsequently a constant voltage charging was conducted with a voltage value of 4.2 V. The total charging time by the time of finishing the charging was 15 hours for the batteries in Examples 1A-4A and 8A, and 7.5 hours for the batteries in Examples 10A-15A and Comparative Example 1A. The charged batteries were discharged respectively at discharging current of 0.2 C and 2 C by the time that the battery voltages became 3.0 V. Then, the discharging capacities at the discharging of 0.2 C and 2 C were calculated respectively, and the rate of the discharging capacity at 2 C to the discharging capacity at 0.2 C was evaluated as a load characteristic. The results are shown in Table 5.

TABLE 5

| Battery | Load characteristic (capacity rate) (%) |
|---|---|
| Example 1A | 60 |
| Example 2A | 85 |
| Example 3A | 72 |
| Example 4A | 80 |
| Example 8A | 75 |
| Example 10A | 90 |
| Example 11A | 80 |
| Example 12A | 85 |
| Example 13A | 63 |
| Example 14A | 82 |
| Example 15A | 68 |
| Comparative Example 1A | 60 |

Each of the batteries in the above Examples 1A-4A, 8A, and 10A-15A had a load characteristic equal or superior to the battery in Comparative Example 1A where a conventional separator was used, and the batteries exhibited their functions without any substantial problems.

Furthermore, the batteries in Examples 4A-7A, 9A, Comparative Examples 1A and 2A were charged on the above-described condition (total charging time: 15 hours), the charging capacities and the discharging capacities were calculated respectively, and the rates of the discharging capacities to the charging capacities were evaluated as the charging efficiencies. The results are shown in Table 6.

TABLE 6

| Battery | Charging efficiency (capacity rate) (%) |
|---|---|
| Example 4A | 99.5 |
| Example 5A | 99.9 |
| Example 6A | 99.6 |
| Example 7A | 99.3 |
| Example 9A | 99.5 |
| Comparative Example 1A | 99.5 |
| Comparative Example 2A | 56 |

The batteries in Examples 4A-7A and 9A had charging efficiencies of substantially 100% similarly to the case of Comparative Example 1A, and formation of lithium dendrite at the time of charging was suppressed. In contrast, for the battery in Comparative Example 2A including only the filler particles in the pores of the porous base, the charging efficiency was poor and internal short-circuit due to the formation of lithium dendrite at the time of charging was found. It was considered that since the alumina fine particles used as the filler particles were shaped differently from the plate shape that provides excellent effect in suppressing formation of lithium dendrite, formation of the lithium dendrite might not be suppressed in a case where shutdown resin particles do not coexist.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

As described above, by forming a separator of a porous film including: a porous base that has a heat-resistant temperature of not lower than 150° C. and contains filler particles; and at least one kind of shutdown resin selected from the group consisting of resin A that has a melting point in a range of 80 to 130° C. and resin B that absorbs a nonaqueous electrolyte and swells due to heating, and the swelling degree is increased as the temperature rises, it is possible to provide a separator having characteristics equal or superior to the characteristics of a conventional separator and having excellent safety at high temperature, and also an electrochemical device using the same separator.

The invention claimed is:

1. A separator for an electrochemical device, comprising a porous film comprising a porous base and a shutdown resin, wherein
    the porous base comprises a coating film and has a heat-resistant temperature of not lower than 150° C., the coating film being formed by integrating a number of filler particles with a binder,
    wherein the filler particles include plate-like boehmite particles,
    a content of the binder in the coating film is 2.4 to 4.8 mass %, and
    the filler particles and the shutdown resin are separately distributed unevenly in the form of a layer parallel to a film face of the separator.

2. The separator for an electrochemical device according to claim 1, wherein the porous base has a thickness of not more than 20 μm.

3. The separator for an electrochemical device according to claim 1, wherein plate-shape surfaces of the plate-like boehmite particles are oriented to be parallel to a film surface of the porous base.

4. The separator for an electrochemical device according to claim 1, wherein the filler particles include particles having an aspect ratio in a range of 2 to 10 as the plate-like boehmite particles.

5. A separator for an electrochemical device, comprising a porous film comprising a porous base and a resin, wherein
    the porous base comprises a coating film and has a heat-resistant temperature of not lower than 150° C., the coating film being formed by integrating a number of filler particles with a binder,
    the filler particles include plate-like boehmite particles,
    the resin includes at least one shutdown resin selected from the group consisting of resin A that has a melting point in a range of 80° C. to 130° C., and resin B that absorbs an electrolyte and swells due to heating, and the swelling degree is increased as the temperature rises,
    a percentage of the porous base is not less than 10 vol. % and not more than 90 vol. % of whole ingredients of the separator, the separator for an electrochemical device has a thickness of not more than 30 μm, and
    the filler particles and the shutdown resin are separately distributed unevenly in the form of a layer parallel to a film face of the separator.

6. The separator for an electrochemical device according to claim 5, wherein air permeability expressed as a Gurley value is in a range of 10 to 300 (sec/100 L).

7. The separator for an electrochemical device according to claim 5, wherein the content of the shutdown resin is not less than 45.2 vol. % and not more than 80 vol. % of whole ingredients of the separator.

8. The separator for an electrochemical device according to claim 5, wherein the separator has a porosity of 20% or more and 70% or less.

9. The separator for an electrochemical device according to claim 5, wherein a content of the binder in the coating film of the porous base is 2.4 to 4.8 mass %.

10. An electrochemical device comprising a positive electrode, a negative electrode, a nonaqueous electrolyte and a separator,
    wherein the separator is the separator for an electrochemical device according to claim 5.

11. The electrochemical device according to claim 10, wherein the separator is integrated with the positive electrode or the negative electrode.

* * * * *